(12) United States Patent
Gomez

(10) Patent No.: US 6,704,613 B2
(45) Date of Patent: Mar. 9, 2004

(54) OPTIMIZED AUTOMATIC WAREHOUSE

(76) Inventor: Gines Sanchez Gomez, Calle Cervantes 1, 7°, B, Mostoles (Madrid) (ES), 28932

( * ) Notice: Subject to any disclaimer, the term of this patent is extended or adjusted under 35 U.S.C. 154(b) by 0 days.

(21) Appl. No.: 10/258,247

(22) PCT Filed: Mar. 17, 2001

(86) PCT No.: PCT/ES01/00107

§ 371 (c)(1),
(2), (4) Date: Oct. 14, 2002

(87) PCT Pub. No.: WO01/87744

PCT Pub. Date: Nov. 22, 2001

(65) Prior Publication Data

US 2003/0077152 A1 Apr. 24, 2003

(30) Foreign Application Priority Data

May 17, 2000 (ES) .............................. 0001257

(51) Int. Cl.⁷ ................................ G06F 7/00
(52) U.S. Cl. ....................... 700/214; 700/215
(58) Field of Search ................. 700/214, 215, 700/216; 414/276, 268, 331.04, 331.05; 198/347.1, 347.2, 347.4

(56) References Cited

U.S. PATENT DOCUMENTS

| | | | |
|---|---|---|---|
| 3,709,353 A | | 1/1973 | Sheetz |
| 4,031,998 A | | 6/1977 | Suzuki et al. |
| 4,527,937 A | | 7/1985 | Tomasello, Jr. |
| 4,561,820 A | | 12/1985 | Matheny, III et al. |
| 4,842,122 A | | 6/1989 | Van Nort |
| 5,238,349 A | * | 8/1993 | Grace, Sr. ................ 414/269 |
| 5,452,786 A | | 9/1995 | Gilmore |
| 6,139,240 A | | 10/2000 | Ando |
| 6,186,724 B1 | * | 2/2001 | Hollander ................ 700/216 |
| 6,357,985 B1 | * | 3/2002 | Anzani et al. ......... 414/331.05 |

FOREIGN PATENT DOCUMENTS

| | | |
|---|---|---|
| GB | 1058038 | 2/1967 |
| WO | WO 0017022 | 3/2000 |
| WO | WO 0053518 | 9/2000 |

* cited by examiner

Primary Examiner—Gene O Crawford

(57) ABSTRACT

One or two belts-staircases link several storage levels. Each storage level has linear storage belts accessed through a level belt. At the intake to levels and storage belts there are divertors to divert merchandises into them. To control the flow, there are photoelectric cells and tag readers at the intakes and outlets of the various devices.

10 Claims, 4 Drawing Sheets

OPTIMIZED AUTOMATIC WAREHOUSE

CROSS-REFERENCE TO RELATED APPLICATIONS

Figure 1:
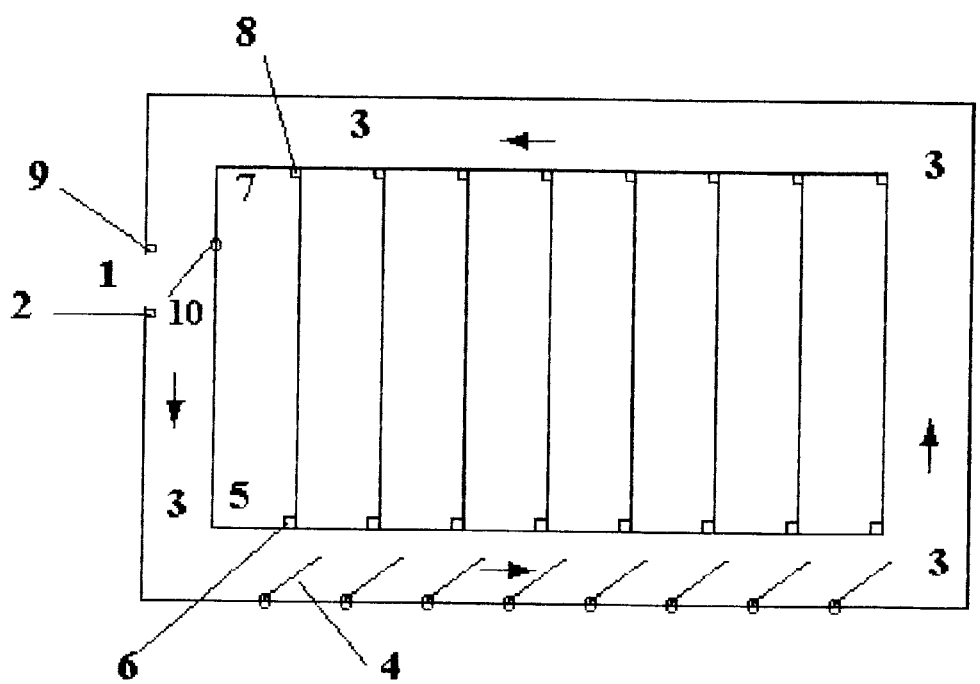

WO0017072, Mar. 30, 2000, entitled 'Almacén automático' (Automatic Warehouse).

WO0053518, Sep. 14, 2000, entitled 'Sistema de almacenamiento automático de especial aplicación a vehículos' (Automatic Storage System, especially Suitable for Vehicles).

FIELD OF THE INVENTION

The invention belongs to the technical field of the devices of storage and handling of goods, including the preparation of orders for customers.

BACKGROUND OF THE INVENTION

Taking my inventions WO0017072 and WO0053518 as a starting point, the aim is to obtain a more compact storage with less internal paths for the merchandise. Said inventions can be considered as the previous state of the technique covered by the invention I propose in this application, although it takes from them any elements, it combines them in such a way that the result is more efficient than separately.

BRIEF SUMMARY OF THE INVENTION

The system relies on the following principles:

A closed connection conveyor belt (i.e., a belt whose points always follow a periodic path, such as those used to transport luggage at airports) with a rectangular shape.

All merchandises are in barcode-tagged parcels. Parcels must be considered in a generic sense. Therefore, a parcel may be a pallet, a package, a barrel, etc. There is not any problem if several parcels carry the same barcode, provided that their contents are consistent with the barcode. Thus, in the case of massive storage, two pallets containing the same type of detergent can carry the same barcode (if a certain rotation of the product is needed, the entry date in the warehouse can be used). In the case of a transportation agency, several parcels with the same destination may as well carry the same barcode.

The merchandise enters the closed connection belt through a photoelectric cell and tag reader, leaving said closed belt by activating a level outlet divertor, passing through a level outlet tag readers and photoelectric cells.

On two sides (opposite to each other) of the closed connection belt, there are linear storage belts. The intake to these lineal storage belts is on a side of the closed connection belt, equipped with initial photoelectric cells, initial tag readers and divertors. The outlet is on the other side of the closed connection belt and is equipped with a final tag readers.

The circular belt turns in the following direction: intakes to the linear storage belts, outlets from the linear storage belts.

The following is a description of the two essential functions of the warehouse, i.e. parcel storing and recovering.

Parcel storing. The parcel is placed on the closed connection belt and passes first through the photoelectric cell and then through the tag reader. The cell sends a signal to the computer both when it is switched on and off, which, however, will only be acknowledged if confirmed by a 'correct reading' message from the tag reader. The computer then determines the belt length occupied by the parcel by a simple calculation: occupied length=time between cell's on and off signals×belt speed. Depending on the length measured, the computer activates the divertors of the linear storage belts, which have free space for that parcel. When the parcel comes across the first divertor, this divertor enters it on the corresponding lineal storage belt and the linear storage belt starts to move and determines its length and barcode with its photoelectric cell and tag reader. These data are transmitted to the computer, which finishes the operation and leaves the system standing by.

During these storage operations, if the parcel has not been successfully detected on the input of the closed connection belt, there are two options: either let the parcel go around the closed connection belt until it leaves it or make the parcel pass again through the intake of the linear storage belt (we are talking about a rotary belt).

Parcel recovering. The computer orders that all parcels between the end of the linear storage belt containing the desired parcel and the parcel itself be released, simply by activating the belt and stopping it when the barcode is detected at the outlet, while activating the divertor of that linear belt. All merchandise, except the desired parcel, is re-entered on its linear storage belt after being carried on the circular belt. The desired parcel, which is the last one, when passes through the tag reader of the outlet of the closed connection belt, activates the outlet divertor of said closed connection belt and it is released.

Obviously, most times parcels will be entered and released in groups. Therefore, placing these groups on the same linear belt can be really effort-saving.

The system can be further completed by multiple-level storage, i.e., by networks of belts, similar to the ones described, installed on levels connected to sloping conveyor belts (belt-staircases). Also these would be very similar to an escalator (moving staircases).

INDEX OF FIGURES

FIG. 1. Storage level.

Figure 2:
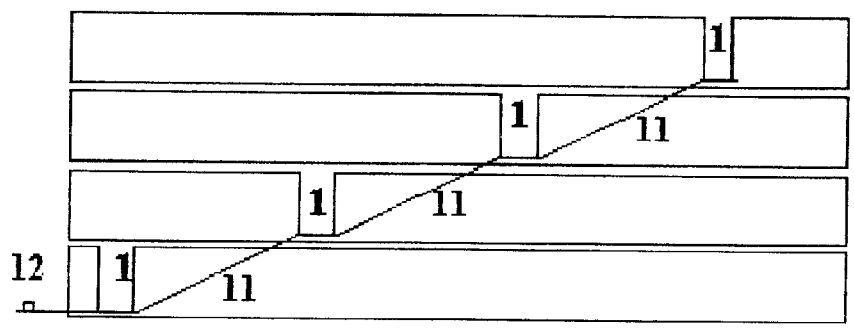

FIG. 2. Multiple-level warehouse.

Figure 3:
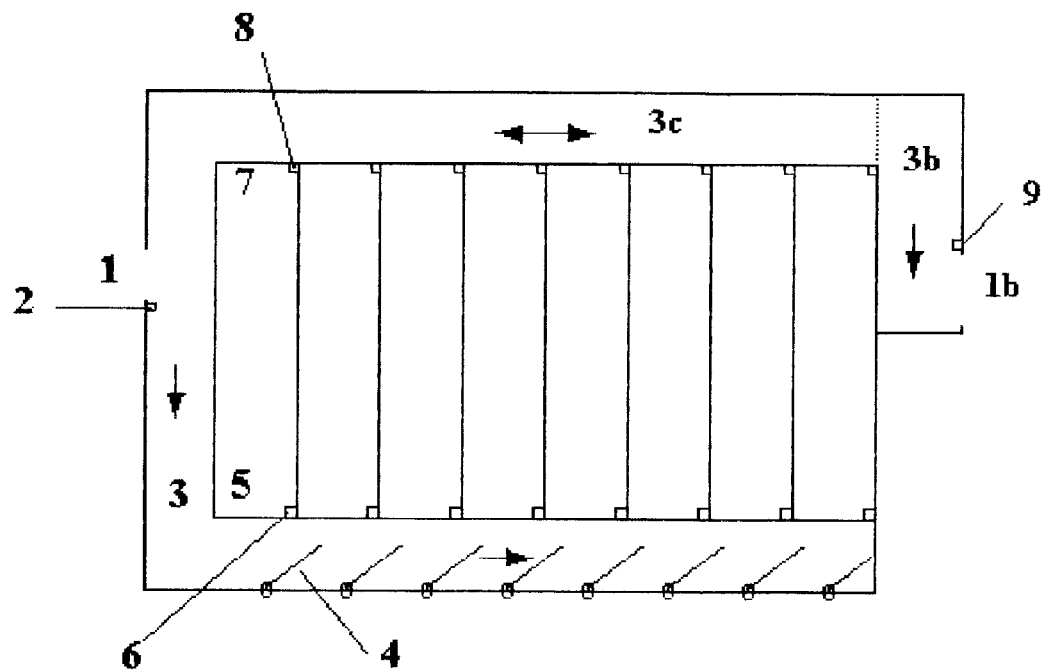

FIG. 3. Another horizontal warehouse variation.

Figure 4:
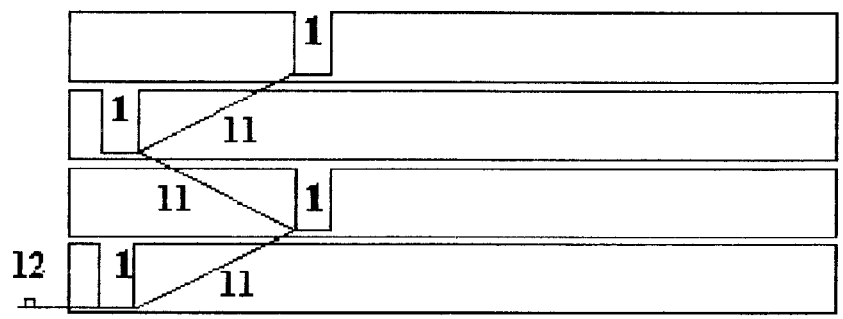

FIG. 4. Another belt-staircase or moving staircase type (changing direction).

Figure 5:
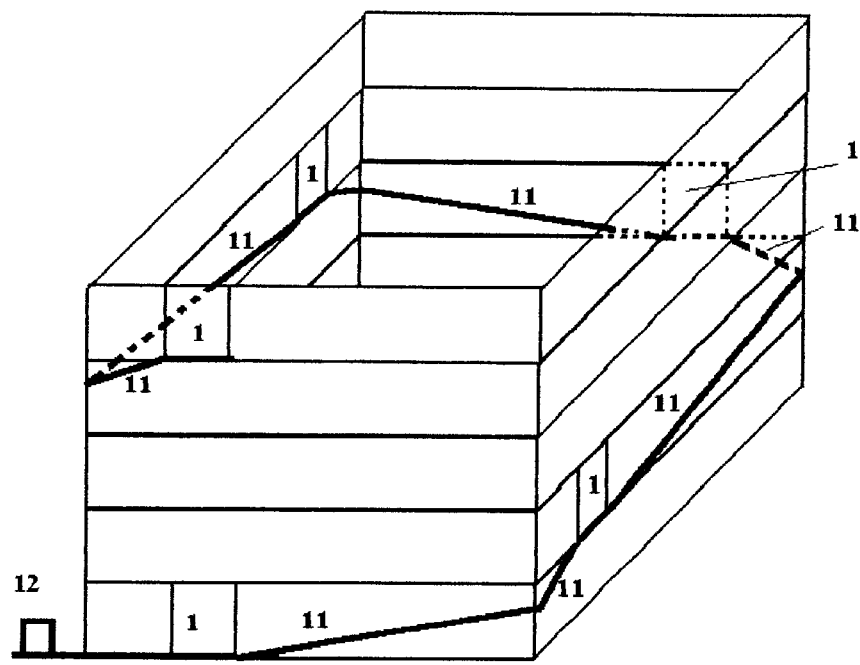

FIG. 5. Another belt-staircase type (surrounding the warehouse).

Figure 6:
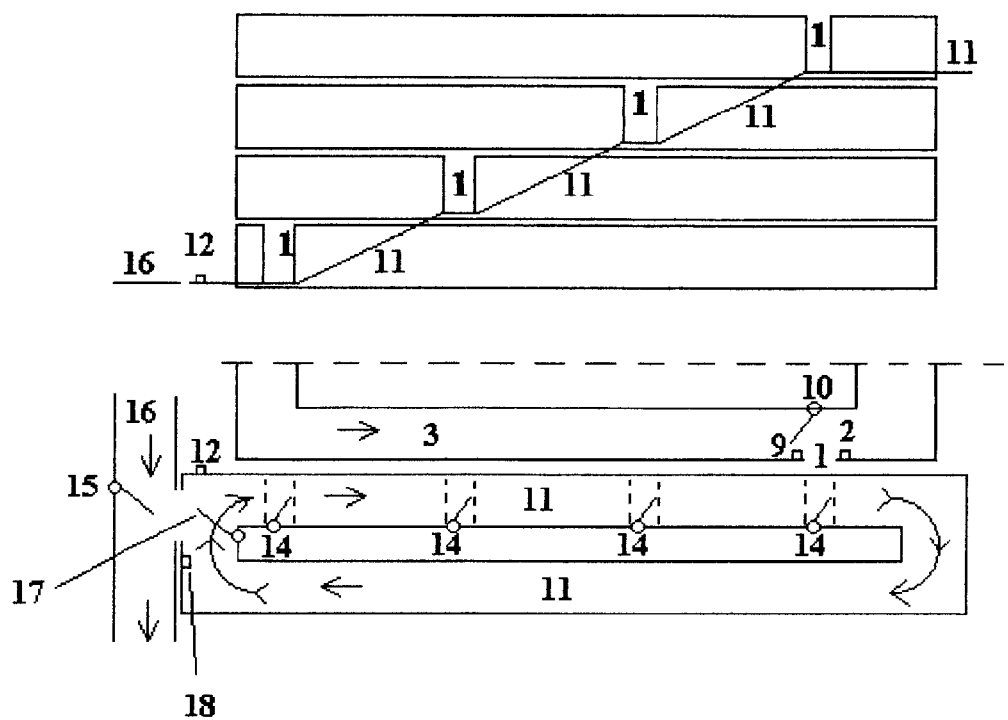

FIG. 6. Multiple-level warehouse with closed belt-staircase or moving staircase.

Figure 7:
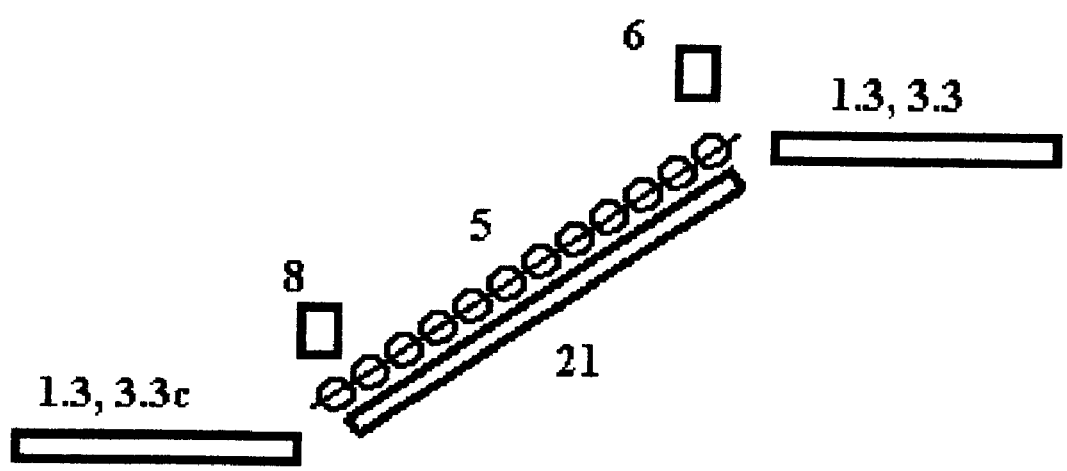

FIG. 7. Gravity roller belts as linear storage belts.

Numbering of elements in figures is the same for every one.

All figures are described in the following sections.

DETAILED DESCRIPTION OF THE INVENTION

The embodiment would consist in a multiple-level warehouse, each level of which similar to the previous one (except for the location of the intake/outlet).

FIG. 1. Storage Level

The merchandise goes from the landing 1, passing through a photoelectric cell and tag reader 2, entering a connection closed belt 3, until it comes across a divertors 4, which drags it on a linear storage belt 5, and passing previously through an initial photoelectric cell and an initial tag reader 5.

The merchandise goes out through the outlet of the linear storage belt 7, passing through a final tag reader 8 and entering the closed connection belt 3, which takes it to the landing 1 by activating the divertor 10, which was in turn activated by the tag reader 9.

FIG. 2. Multiple-level Warehouse

The illustration represents a multiple-level warehouse pattern in which each level is similar to the previous one. A belt-staircase or moving staircase 11 comprises so many landing and flights as the number of levels located above the first one, and these flights are simply conveyor belts.

Each flight ends in a landing 1 through which a level is accessed by activating a divertor or pusher 14.

In the case of this embodiment, the belt-staircase or moving staircase goes upwards on the side of the levels and downwards on the most external part.

As for every intake, a photoelectric cell and a tag reader are located at the warehouse intake.

FIG. 1 and FIG. 2. General Warehouse Operation

The merchandise enters the warehouse passing through the photoelectric cell and tag reader (12). Thus the computer estimates the parcel length and activates the divertor of the landing where the merchandise is supposed to be better placed.

To recover the merchandise, it is launched to the corresponding landing 1, then it runs through the belt-staircase or the moving staircase up to the top level, and then goes down again to the ground level, where it is delivered.

Both the ascent (intake) and the descent (outlet) may end on a same conveyor belt 16, provided that the warehouse intake has a divertor activated by the computer or the tag reader 12.

FIG. 3 Another Horizontal Warehouse Variation

In this figure, instead of the closed connection belt 3, there are three linear belts: a first connection belt 3, a second connection belt 3c and an level outlet belt 3b. The second connection belt 3c must be able to move in both directions. The input of merchandise is basically similar to the input mentioned for FIG. 1; however, for the output, the merchandise preceding (from the end) the desired one on its linear belt must be released and re-arranged first, thus taking advantage of the reversibility of the second connection belt 3c.

According to this layout, there would be two belt-staircases or moving staircases: one ascending 11, and one descending on the opposite side 11b. The arrows show the direction followed by the merchandise.

FIG. 4. Another Belt-staircase or Moving Staircase Type (Changing Direction)

The layout of the FIG. 3 would allow the belts-staircases or moving staircases to look more like ordinary staircases that change directions on every landing, as it is showed in FIG. 4, which is very difficult in the case of the layout of the FIG. 1 and the FIG. 2. This would shorten the paths.

FIG. 5. Another belt-staircase type (changing direction).

Furthermore, the belt-staircases, in order to obtain less steep slopes, can go around the levels, in the same way as ancient ziggurats, obviously changing the direction of the linear storage belts of each level. However, this could lengthen the path for the merchandise.

FIG. 6. Multiple-level warehouse with closed belt-staircase or moving staircases.

The belt-staircase or moving staircase are closed, having a divertor 17 and a tag reader 18 at they input/outlet. It allows rearranging the merchandise and to prepare orders for clients on a regular basis, since activating or deactivating divertors or pushers would be enough. To prepare client orders, the merchandises of the same type are stored in some linear storage belts so that in each one of them there is only one type of merchandise. To each client is assigned one or several empty linear storage belts.

FIG. 7. Gravity Roller Belts as Linear Storage Belts

The linear storage belts 5 can be gravity roller belts equipped with a braking system 21, so that the movement in the belt is caused by the action of gravity on the merchandise. The belt would be activated by simply releasing the branking system, being the same, for example, one or several brake surfaces pressing against the rollers.

I claim:

1. A warehouse of several storage levels, suitable for being computer-controlled, that enables the storing and recovering of a barcode-tagged merchandise, comprising a belt-staircase or moving staircase, connecting all the storage levels and a warehouse intake, the belt-staircase or moving staircase having a landing for each storage level, each landing having a level input divertor or pusher to the storage level, each storage level having a level outlet divertor, a level outlet tag reader, several linear storage belts, a first connection belt to transport the barcode-tagged merchandise from the landing to the linear storage belts, and a second connection belt to transport the barcode-tagged merchandise from the linear storage belts to the landing, the first connection belt having a divertor for each linear storage belt, each linear belt having an initial photoelectric cell, an initial tag reader and a final tag reader.

2. The warehouse of claim 1 characterised in that the belts-staircases or moving staircases change directions in every landing.

3. The warehouse of claim 1, being the linear storage belts gravity roller belts, comprising a braking system.

4. The warehouse of claim 1 characterised in that the belt-staircase or moving staircase rising, and comprising a second descending belt-staircase or moving staircase, wherein the second connection belt links the storage belts with the second descending belt-staircase or moving staircase.

5. The warehouse of claim 4 characterised in that the belt-staircases or moving staircases change directions in every landing.

6. The warehouse of claim 1 characterised in that the belt-staircase or moving staircase rising from the first storage level to the last storage level, then changing directions, and going down, the first connection belt and the second connection belt being linked, obtaining a unique closed connection belt, basically of a rectangular shape.

7. The warehouse of claim 6, characterised by the basically square shape of the storage levels and by the belt-staircase or moving staircase surrounding the warehouse, accessing the storage levels from all four sides.

8. The warehouse of claim 6 characterized in that the belt-staircase or moving staircase is closed.

9. A computer-controlled method for storing and recovering a parcel of a barcode-tagged merchandise on a plurality of linear storage belts comprising, storing the parcel into the most appropriate linear storage belt, according to the length of the parcel, and confirming with the computer the storage of the parcel, recovering the parcel by re-storing the previously barcode-tagged merchandise of the lineal storage belt into the lineal storage belt.

10. The computer-controlled method of claim 9 for preparing client orders, comprising storing the barcode-tagged merchandise into the linear storage belts by type, assigning some empty linear storage belts to each client order.

* * * * *